May 17, 1938.  D. D. ROBERTSON  2,117,986

PISTON RING CONSTRUCTION

Original Filed March 11, 1935   2 Sheets-Sheet 1

INVENTOR.
Delmar D. Robertson
BY Leonard L. Kalish
ATTORNEY.

May 17, 1938.  D. D. ROBERTSON  2,117,986
PISTON RING CONSTRUCTION
Original Filed March 11, 1935  2 Sheets-Sheet 2
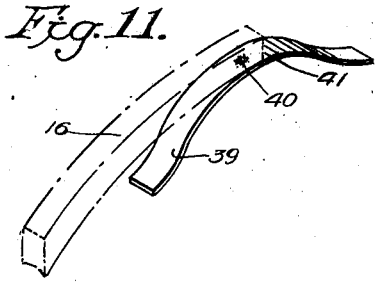
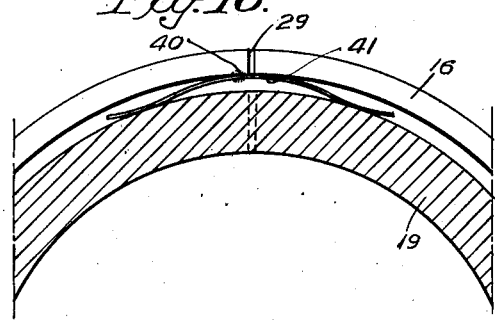
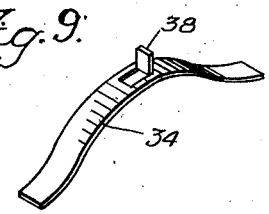
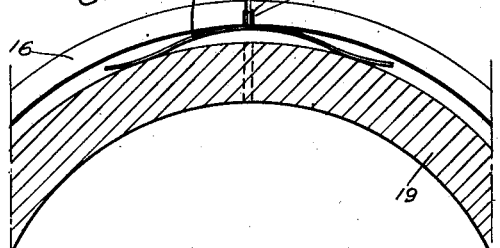
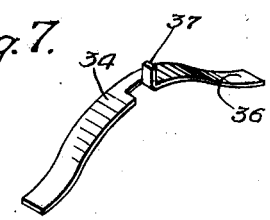
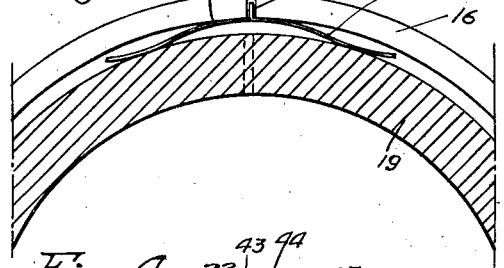
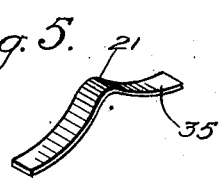
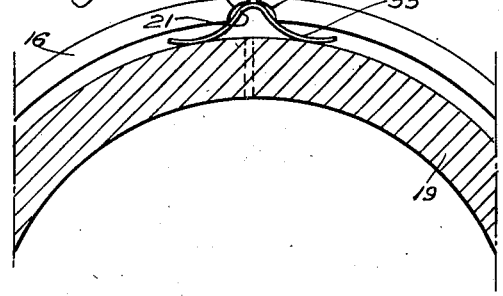
INVENTOR.
Delmar D. Robertson
BY
Leonard L. Kalish
ATTORNEY.

Patented May 17, 1938

2,117,986

UNITED STATES PATENT OFFICE 2,117,986

PISTON RING CONSTRUCTION

Delmar D. Robertson, Lansdowne, Pa., assignor to Wilkening Manufacturing Company, Philadelphia, Pa., a corporation of Delaware Application March 11, 1935, Serial No. 10,385
Renewed July 29, 1936

11 Claims. (Cl. 309—43)

The present invention relates to certain new and useful piston ring construction, and relates more particularly to certain new and useful construction in split annular metallic piston rings, that is, piston rings of a generally annular form, but interrupted at one point to permit the radial expansion thereof.

The object of the present invention is to give radial support to the two ends of the piston ring, that is to the piston ring on either side of the break or "gap". Thus, it has been found that at high speeds the two "ends" of the piston ring tend to collapse inwardly and to flutter between collapse and expanded positions, and this tends to increase the "blow-by" and to render the piston ring less effective. Thus, the combination of the inertia forces at high speeds, together with the high gas pressures, tend to set up a vibration of the piston ring near the gap which tends to increase the "blow-by" and also tends to increase the passage of oil from the crank case into the combustion chamber.

With the above and other objects in view, which will appear more fully from the following description, the present invention consists of a split annular and radially expansible sealing member or ring, and an expander spring intermediate the gap thereof and the inner wall of the ring receiving groove and interlocked with the gap so as to urge the free ends of the ring outwardly and so as also to prevent any shifting of the spring in relation to the gap in a circumferential direction.

The present invention also consists of other novel features as well as details of construction, all of which will appear more fully from the following detailed description and accompanying drawings.

Referring to the drawings in which like reference characters indicate like parts.

Figure 4 represents a fragmentary top plan view of a modified form of piston ring construction embodying the present invention.

Figure 5 represents a perspective view of the expander member of the modified form shown in Figure 4.

Figure 6 represents a fragmentary top plan view of a modified form of construction embodying the present invention.

Figure 7 represents a perspective view of the expander member of the modified form shown in Figure 6.

Figure 8 represents a fragmentary top plan view of a further modified form of construction embodying the present invention.

Figure 9 represents a perspective view of the expander member of the modified form shown in Figure 8.

Figure 10 represents a fragmentary top plan view of the further modified form of construction embodying the present invention.

Figure 11 represents a perspective view of the expander member of this modified form.

The present invention may be embodied in what may be called spring-expanded or spring-supported piston rings, as well as in piston rings which rely wholly upon their inherent tension and resiliency to make sealing contact with the cylinder wall.

Figure 1:
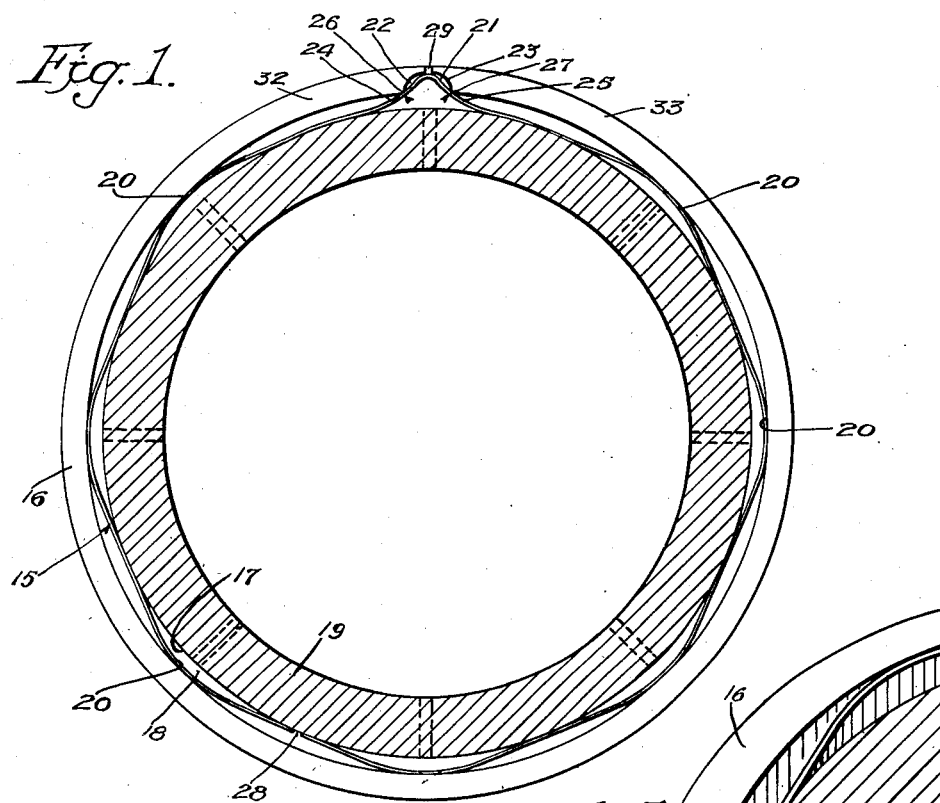
Figure 1 represents a top plan view of a piston ring construction embodying this invention with the piston shown in section.
Figure 2:
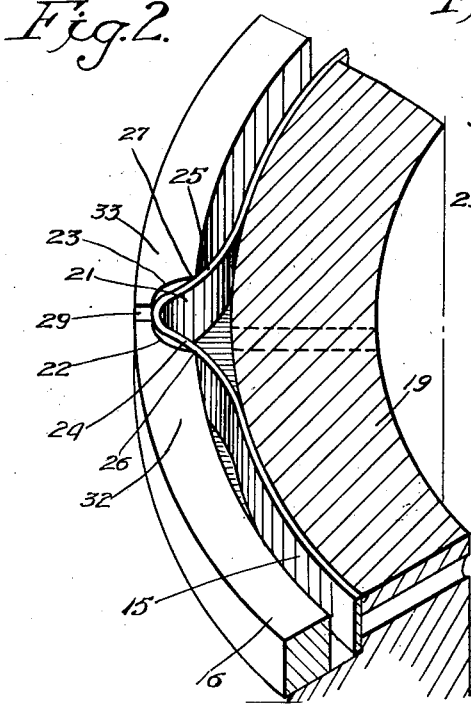
Figure 2 represents a fragmentary perspective view of the same on an enlarged scale.
Figure 3:
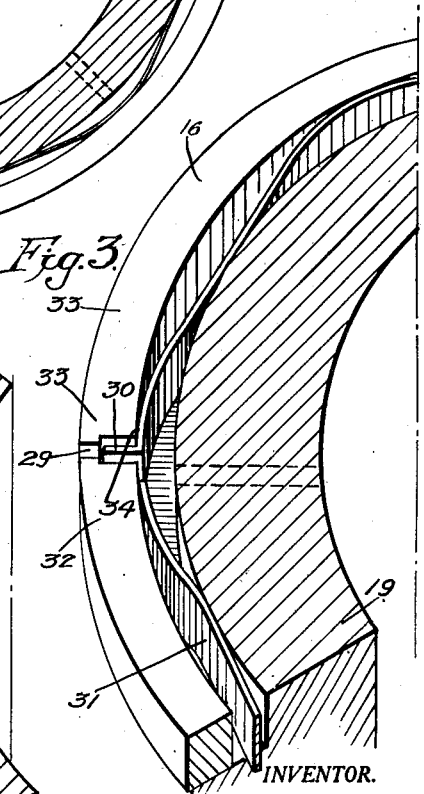
Figure 3 represents a similar fragmentary perspective view of a somewhat modified form of construction embodying my invention.

In Figures 1, 2 and 3 the invention is shown illustrated in relation to spring-expanded piston rings, while in Figures 4 to 11 inclusive, the invention is illustrated in relation to self-tensioned piston rings.

In the embodiment of the invention illustrated in Figures 1 and 2, any suitable more or less polygonal or sinuous type flat ribbon expander spring 15 may be provided intermediate the sealing ring 16 and the inner wall 17 of the ring receiving groove 18 of the piston 19, and one or more of the outer contact points 20 is bent or formed with a slightly sharper curvature or point, as for instance 21, and the inner corners of the ends of the ring are recessed by filleting or rabbeting as at 22 or 23, thereby forming an enlarged gap into which the point 21 may fit. If desired, the recesses 22 and 23 are so proportioned in relation to the angle included generally between the sides 24 and 25 of the interlocking point 21 of the spring, that the corner 26 and 27 will contact the sides 24 and 25 so that the interlocking point 21 will bear against the two corners 26 and 27 and also act in the fashion of a wedge to some extent so as to exert not only radial pressure but also a certain amount of tangential force on the two ends, thereby giving support in both directions. The interlocking point 21 is preferably placed at some point removed from the gap 28 in the expander spring.

The recesses 22 and 23 do not extend through the entire radial depth of the ring but have a shorter radial depth so that the outer surface of the ring is not disturbed in any way by the recess 22 and 23, as indicated in Figures 1 and 2;—the outer surface being interrupted merely by the usual or normal gap 29 in the ring.

If desired, each of the outer contact points or zones 20 may be made slightly more acute or more sharply formed so that any one of the contact points may be utilized for interlocking engagement with the recesses 22 and 23, although in the drawings of Figures 1 and 2 only one of the contact points has been shown so formed. In forming all the contact points in a similar way, the need for selection is eliminated during the installation of the ring. On the other hand, it may be more desirable to provide the outer contact zones as indicated in Figure 1.

In the embodiment of the invention shown in Figure 3, a prong or tongue 30 is stamped out of the expander spring 31 which is otherwise similar to the expander spring 15 (may be either sinuous or more or less polygonal shape);—the prong or tongue 30 being stamped out either immediately adjacent to one edge of the flat ribbon like expander spring or intermediate the two edges thereof in the general manner indicated for instance in Figures 7 and 9, respectively. In this embodiment of the invention the prong or tongue merely fits into the conventional gap 29 of the piston ring 16, and serves merely to prevent displacement and to insure radial support for both ends 32 and 33 of the ring. In this embodiment of the invention, the outer contact of the point or zone 34 of the expander spring in which the tongue 30 is formed is preferably made in a relatively large radius so as to insure ample contact with both ends 32 and 33 of the ring 16 on the opposite sides of the tongue or prong 30.

In the embodiments of the invention shown in Figures 5 to 11 inclusive, relatively short spring members are provided intermediate the ends 32 and 33 of the ring and the inner wall of the ring receiving groove merely for the purpose of supporting said ends;—the sealing contact between the rest of the piston ring and the cylinder wall being dependent on the inherent tension of the piston ring or upon other means. In the embodiment shown in Figures 4 and 5, a construction similar to that shown in Figures 1 and 2 is implied;—the single spring member 35 being formed with a relatively sharp bend 21 adapted to fit within the recesses 22 and 23 in a manner similar to that indicated in Figures 1 and 2.

In Figure 7 the spring member 36 is provided with a tongue or prong 37 pressed out adjacent one edge, while in the embodiment shown in Figures 8 and 9 a similar prong 38 is pressed out of the spring intermediate its two edges. In both the embodiments shown in Figures 6 and 7, 8 and 9 the outer contact zone 34 is sufficiently broad or wide to afford ample contact with both ends of the piston ring and the spring member being in each instance formed so as to be compressed radially when mounted between the ring and the inner wall of the ring receiving groove, thereby to exert outward radial pressure upon both ends of the ring.

In the embodiment of the invention shown in Figures 10 and 11, the expender spring member 39 is more or less permanently secured to one end of the ring, for instance at the point 40, by welding or by spot welding or other means with the contact zone 41, sufficiently broad to give support to the other end of the ring as well.

If desired, the gap 29 may be recessed slightly as at 42 so as to give greater clearance for the tongue 30, 37 or 38, so that the gap 29 may be kept smaller, notwithstanding the interposition of the interlocking tongue 30, 37 or 38;—the recessing being confined to the inner portion of the gap as indicated in the drawings. Likewise, in the embodiment of the invention indicated in Figures 1, 2, 4 and 5, the contact between the ends of the piston ring and the interlocking point 21 may be effected, as stated, either at the corners 26 and 27, thereby creating a slight wedging as well, which would result in tangential force, or it may be effected at the points 43 and 44, thereby exerting merely radial force upon said ends.

By the present invention, the repeated vibration or fluttering on free ends of the rings is eliminated at high speeds.

The invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention what is hereby claimed as new and desired to be secured by Letters Patent, is:

1. A sealing device for use in combination with a cylinder and a piston adapted to reciprocate therein and having a ring-receiving groove, said sealing device including an interrupted annular metallic ring having a gap intermediate its two ends at the point of interruption and a recess formed in the inner circumference of said ring at the gap and communicating with said gap, said ring having pronounced corners at both sides of the mouth of said recess and a spring operatively interposed between the two ends of the ring and extending into said recess contacting both said ends of the ring and on either side of said gap, thereby to give radial support to both ends of the ring and to tend to prevent the radial collapse of the ends of the ring and to prevent the circumferential shifting of the spring in relation to the ring.

2. A sealing device for use in combination with a cylinder and a piston adapted to reciprocate therein and having a ring-receiving groove, said sealing device including an interrupted annular metallic ring having a gap intermediate its two ends at the point of interruption and a recess formed in the inner circumference of said ring at the gap and communicating with the gap, said ring having pronounced corners at both sides of the mouth of said recess and a spring bearing against the two ends of the ring and having a bent ring-contact portion extending into said recess and contacting both said corners of the ring, thereby to give radial support to both ends of the ring and to tend to prevent the radial collapse of the ends of the ring and to prevent the circumferential shifting of the spring in relation to the ring.

3. A sealing device for use in combination with a cylinder and a piston adapted to reciprocate therein and having a ring receiving groove, said sealing device including an interrupted annular metallic ring having a gap intermediate its two ends at the point of interruption and a recess formed in the inner circumference of said ring at the gap and communicating with the gap, said ring having pronounced corners at both sides of said recess and a spring operatively interposed between the two ends of the ring and having a portion integral therewith and extending into said recess, said spring contacting both said ends of the ring, thereby to give radial support to both ends of the ring and to tend to prevent the radial collapse of the ends of the ring and to provide a positive interlock against the circumferential shifting of the spring in relation to the ring.

4. A sealing device for use in combination with a cylinder and a piston adapted to reciprocate therein and having a ring receiving groove, said sealing device including an interrupted annular metallic ring having a gap intermediate its two ends at the point of interruption and a recess formed in the inner circumference of said ring at the gap and communicating with the gap, said ring having pronounced corners at both sides of the mouth of said recess and a radial-expander-spring adapted to exert circumferentially distributed outward radial pressure upon said ring, and contacting both said ends of the ring at said corners, thereby to give radial support to both ends of the ring and to tend to prevent the radial collapse of the ends of the ring and to prevent positively the circumferential shifting of the spring in relation to the ring.

5. A sealing device for use in combination with a cylinder and a piston adapted to reciprocate therein and having a ring-receiving groove, said sealing device including an interrupted annular metallic ring having a gap intermediate its two ends and a recess at the point of interruption in the inner circumference of said ring and communicating with the gap, said ring having pronounced corners at both sides of the mouth of said recess and a spring extending into said recess and contacting both ends of said ring at said corners and also within said recess, the contact between the spring and the ends of the ring being on a surface of the spring inclined to the radius through the gap, whereby the spring exerts a tangential pressure on the ends of the ring, in addition to giving radial support thereto.

6. A sealing device for use in combination with a cylinder and a piston to reciprocate therein and having a ring-receiving groove, said sealing device including an interrupted annular metallic ring having a gap intermediate its two ends and a recess at the point of interruption in the inner circumference of said ring and communicating with the gap, the ring having pronounced corners at both sides of the mouth of said recess and said spring having portions inclined to the radius through the centre of the recess at less than a right angle and bearing against said corners and having a rounded projection bearing against the ring at the gap.

7. A sealing device for use in combination with a cylinder and a piston adapted to reciprocate therein and having a ring-receiving groove, said sealing device including an interrupted annular metallic sealing ring interrupted only at one point in its circumference and having a gap intermediate its two ends at said single point of interruption, said gap being greater at the inner periphery of the ring than at the outer periphery thereof, and said sealing ring having otherwise a uniform overall cross-sectional area throughout its circumference, and a sinuous spring having a plurality of generally curved ring-contact portions and one outwardly curved ring-interlocking projection of substantially smaller radius than the radii of said curved ring-contact portions adapted to project into said ring gap at the inner periphery of the ring, said spring being operatively interposed between the two ends of said interrupted annular metallic sealing ring and contacting both said ends of said sealing ring and adapted to exert thereon outward radial pressure, and said spring having a pair of radially-operative piston-contact portions generally equidistantly on opposite sides of said gap and spaced from the ends of said spring and adapted for generally radial contact with the innermost wall of a ring-receiving groove;—said spring interlocking with said sealing ring solely at the gap thereof, thereby to give radial support to both ends of said sealing ring and to tend to prevent the radial collapse of the ends of the sealing ring and to prevent the circumferential shifting of the spring in relation to the sealing ring without however weakening the sealing ring.

8. A sealing device for use in combination with a cylinder and a piston adapted to reciprocate therein and having a ring-receiving groove, said sealing device including an interrupted annular metallic sealing ring interrupted only at one point in its circumference, and having a gap intermediate its two ends at said single point of interruption, said gap being greater at the inner periphery of the ring than at the outer periphery thereof and said sealing ring having a generally uninterrupted circular inner peripheral contour throughout its circumference from one side of said inwardly-enlarged gap to the other side of said inwardly-enlarged gap, and a single-piece sinuously curved spring operatively interposed between the two ends of said interrupted annular metallic sealing ring, said spring contacting both said ends of said sealing ring and adapted to exert thereon outward radial pressure and thereafter alternately contacting said piston and said ring along generally curved contact portions, and said spring having a pair of radially-operative piston-contact portions generally equidistantly on opposite sides of said gap and spaced from the ends of said spring and adapted for generally radial contact with the innermost wall of a ring-receiving groove, said ring gap including a generally circularly formed recess disposed at the inner periphery of said ring, the radius of said recess being substantially smaller than the radii of the curved spring ring-contact portions;—said spring interlocking with said sealing ring solely at the gap thereof, thereby to give radial support to both ends of said sealing ring and to tend to prevent the radial collapse of the ends of the sealing ring and to prevent the circumferential shifting of the spring in relation to the sealing ring without however weakening the sealing ring.

9. A sealing device for use in combination with a cylinder and a piston adapted to reciprocate therein and having a ring-receiving groove, said sealing device including an interrupted annular metallic sealing ring interrupted only at one point in its circumference, and having a gap intermediate its two ends at said single point of interruption, said gap being greater at the inner periphery of the ring than at the outer periphery thereof, and said sealing ring having otherwise a uniform overall cross-sectional area throughout its circumference, and a single-piece sinuously shaped spring having an outwardly projecting tongue, centrally struck from one of the outwardly projecting ring-contact portions thereof, operatively interposed between the two ends of said interrupted annular metallic sealing ring, and those parts of said spring ring-contact portion adjoining said tongue contacting both said ends of said sealing ring and adapted to exert thereon outward radial pressure, and said spring having a pair of radially-operative piston-contact portions generally equidistantly on opposite sides of said gap and spaced from the ends of said spring and adapted for generally radial contact with the innermost wall of a ring-receiving groove;—said spring interlocking with said sealing ring solely at the gap thereof, thereby to give radial support to both ends of said sealing ring and to tend to prevent the radial collapse of the ends of the sealing ring and to prevent the circumferential shifting of the spring in relation to the sealing ring without however weakening the sealing ring.

10. A sealing device for use in combination with a cylinder and a piston adapted to reciprocate therein and having a ring-receiving groove, said sealing device including an interrupted annular metallic sealing ring interrupted only at one point in its circumference, and having a gap intermediate its two ends at said single point of interruption, said gap being greater at the inner periphery of the ring than at the outer periphery thereof, and said sealing ring having otherwise a uniform overall cross-sectional area throughout its circumference, said ring having pronounced corners at both sides of the inner mouth of said gap, and a single-piece spring having a radially outward projection thereon operatively interposed between the two ends of said interrupted annular metallic sealing ring, and said spring contacting both said corners of said sealing ring, the contact between the spring and said corners being on a surface of the spring inclined to the radius through the gap, whereby said spring exerts a tangential pressure on the ring ends in addition to exerting thereon outward radial pressure, and said spring having a pair of radially-operative piston-contact portions generally equidistantly on opposite sides of said gap and spaced from the ends of said spring and adapted for generally radial contact with the innermost wall of a ring-receiving groove;—said spring interlocking with said sealing ring solely at the gap thereof, thereby to give radial support to both ends of said sealing ring and to tend to prevent the radial collapse of the ends of the sealing ring and to prevent the circumferential shifting of the spring in relation to the sealing ring without however weakening the sealing ring.

11. A sealing device for use in combination with a cylinder and a piston adapted to reciprocate therein and having a ring-receiving groove, said sealing device including an interrupted annular metallic sealing ring interrupted only at a single point in its circumference and having a gap intermediate its two ends at the point of interruption and having a uniform overall cross-sectional area throughout the circumference thereof on either side of the zone of the gap, a single-piece spring associated with said sealing ring and having a plurality of generally curved ring-contact portions, one of said portions being of substantially smaller radius than the rest and adapted to project into said ring gap at the inner mouth thereof, said spring being interlocked with said sealing ring solely in the zone of said gap and having a piston-contact portion equidistantly on each side of said gap zone and spaced from the ends of said spring thereby to give radial support to both ends of said sealing ring and to tend to prevent the radial collapse of the ends of said sealing ring and to prevent the circumferential shifting of the spring in relation to the sealing ring without weakening the sealing ring.

DELMAR D. ROBERTSON.